(12) United States Patent
Holzapfel et al.

(10) Patent No.: US 8,126,922 B2
(45) Date of Patent: Feb. 28, 2012

(54) CALENDAR SYSTEM

(75) Inventors: Damien Holzapfel, Omaha, NE (US);
Stuart Zimmerman, Omaha, NE (US);
Tadd Martin, Omaha, NE (US)

(73) Assignee: Creighton University, Omaha, NE (US)

(*) Notice: Subject to any disclaimer, the term of this patent is extended or adjusted under 35 U.S.C. 154(b) by 344 days.

(21) Appl. No.: 12/537,923

(22) Filed: Aug. 7, 2009

(65) Prior Publication Data

US 2010/0268741 A1    Oct. 21, 2010

Related U.S. Application Data

(60) Provisional application No. 61/169,613, filed on Apr. 15, 2009.

(51) Int. Cl.
*G06F 7/00* (2006.01)
*G06F 17/30* (2006.01)

(52) U.S. Cl. ......... 707/785; 707/781; 707/783; 707/784

(58) Field of Classification Search .................. 707/781, 707/783, 784, 785
See application file for complete search history.

(56) References Cited

U.S. PATENT DOCUMENTS 5,884,282 A    3/1999    Robinson
(Continued)

OTHER PUBLICATIONS

International Search Report and Written Opinion for PCT/US09/53155 (6 pages).

*Primary Examiner* — Jean B Fleurantin
*Assistant Examiner* — Mark Hershley
(74) *Attorney, Agent, or Firm* — Polsinelli Shughart PC; Robert O. Enyard, Jr.

(57) ABSTRACT

A calendar system displays event data via an electronic calendar form that is accessible over a network by a user of a client computer. The system stores event data for multiple events and selectively displays event data based on whether a calendar access request is received from a guest user or an authenticated user. The system displays event data via a default calendar to guest users and displays event data via a customized calendar to authenticated users. The default calendar displays event data for related events based on a contextual relationship that is derived by examining event data for each the multiple events to determine a position separation and/or a frequency of a user supplied keyword in the event data. The customized calendar displays events based on contextual relationships and based on the viewing history of the user and other input data from user.

20 Claims, 12 Drawing Sheets

U.S. PATENT DOCUMENTS

| | | |
|---|---|---|
| 6,604,059 B2 | 8/2003 | Strubbe et al. |
| 6,640,230 B1 * | 10/2003 | Doss et al. ............................. 1/1 |
| 6,823,357 B1 | 11/2004 | Du et al. |
| 7,174,517 B2 * | 2/2007 | Barnett et al. ................ 715/764 |
| 7,318,040 B2 | 1/2008 | Doss et al. |
| 7,340,484 B2 * | 3/2008 | S et al. ................................. 1/1 |
| 2002/0032609 A1 * | 3/2002 | Wilkman ........................ 705/14 |
| 2002/0090933 A1 * | 7/2002 | Rouse et al. ................... 455/412 |
| 2002/0131565 A1 | 9/2002 | Scheuring et al. |
| 2003/0065742 A1 * | 4/2003 | Culp et al. ..................... 709/218 |
| 2004/0153445 A1 | 8/2004 | Horvitz et al. |
| 2005/0039142 A1 | 2/2005 | Jalon et al. |
| 2006/0168259 A1 * | 7/2006 | Spilotro et al. ............... 709/229 |
| 2006/0200374 A1 * | 9/2006 | Nelken .............................. 705/9 |
| 2006/0206522 A1 | 9/2006 | Austin et al. |
| 2007/0129986 A1 * | 6/2007 | Barnett et al. .................... 705/8 |
| 2007/0219985 A1 | 9/2007 | Aravamudan et al. |
| 2007/0260989 A1 * | 11/2007 | Vakil et al. .................... 715/748 |
| 2008/0027955 A1 | 1/2008 | May et al. |
| 2008/0046471 A1 * | 2/2008 | Moore et al. ............... 707/104.1 |
| 2008/0052162 A1 * | 2/2008 | Wood .............................. 705/14 |
| 2008/0091500 A1 * | 4/2008 | Barber-Mingo et al. ......... 705/9 |
| 2008/0115196 A1 * | 5/2008 | Michel et al. ..................... 726/4 |
| 2008/0244091 A1 * | 10/2008 | Moore et al. .................. 709/246 |
| 2008/0244425 A1 * | 10/2008 | Kikin-Gil et al. ............. 715/764 |
| 2009/0037842 A1 | 2/2009 | Tysowski |
| 2009/0112986 A1 * | 4/2009 | Caceres ........................ 709/204 |
| 2009/0216569 A1 * | 8/2009 | Bonev et al. ...................... 705/5 |
| 2009/0255153 A1 * | 10/2009 | Mori et al. ...................... 40/107 |
| 2009/0265623 A1 * | 10/2009 | Kho et al. ..................... 715/273 |
| 2009/0313074 A1 * | 12/2009 | Harpur et al. ..................... 705/9 |

* cited by examiner

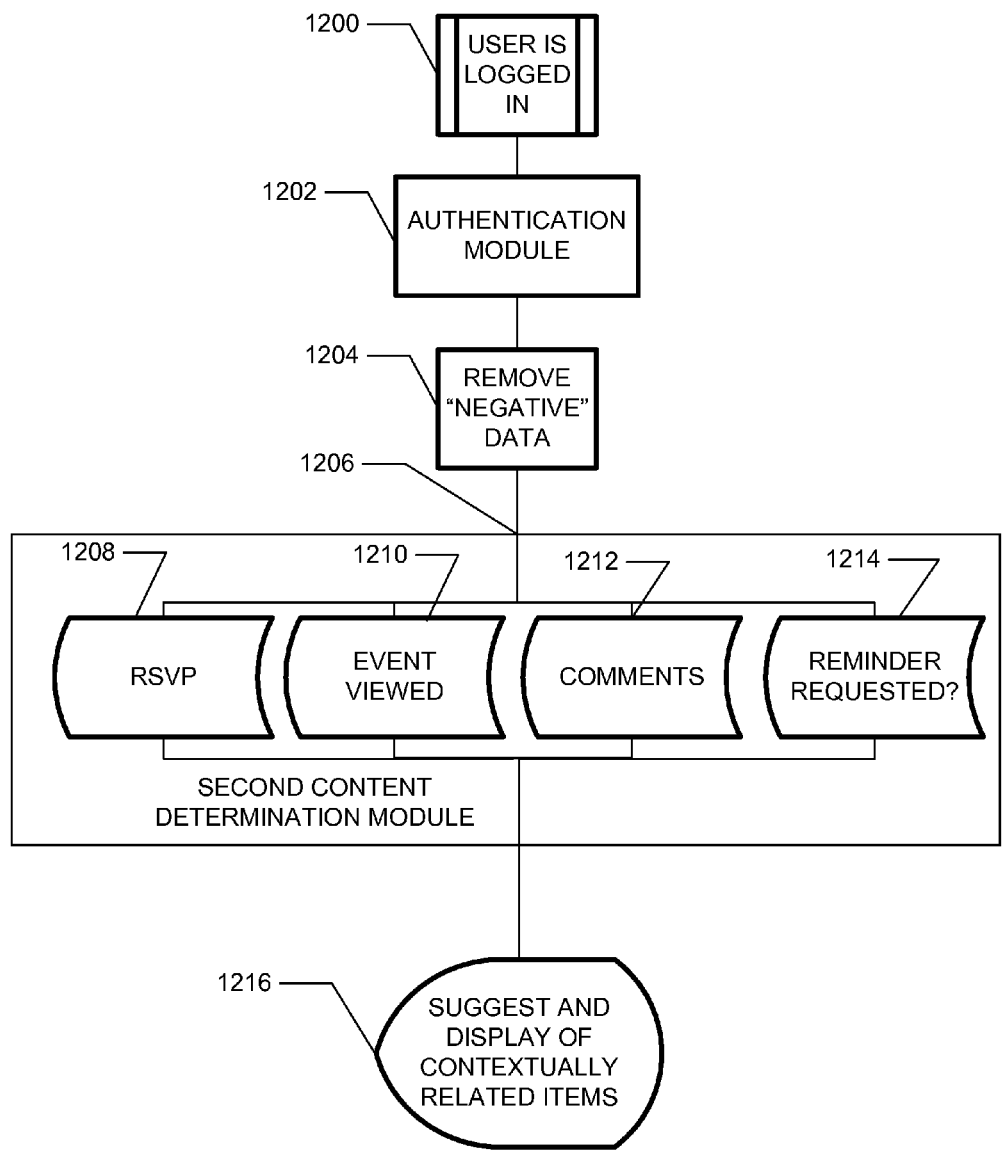

CALENDAR SYSTEM

CROSS REFERENCE TO RELATED APPLICATION

This is a non-provisional patent application, which claims benefit of U.S. Provisional Application No. 61/169,613, entitled "Campus Calendar", filed on Apr. 15, 2009 and is herein incorporated by reference in its entirety.

FIELD

This document relates to a calendar system, and more particularly to a computer-based calendar system having multiple applications accessible over a communication network.

BACKGROUND

With the growth of computer and information systems as well as related network technologies, such as wireless and Internet communications, ever increasing amounts of electronic information are communicated, transferred, and subsequently processed by users and/or systems. For example, educational institutions such as colleges and universities frequently offer web-based services to provide students and/or faculty access to information. Many users, such as students on a college campus, interact with multiple computer applications in order to establish and manage a personal schedule that may cover various school deadlines, meetings, class schedules, social activities, and other campus-related functions. As such, the user may be inundated with multiple activities from various sources that make it difficult, if not impossible, to coordinate and schedule these activities efficiently when managing a personal schedule. In addition, other types of users such as busy professionals are constantly multi-tasking using various computer applications when managing a personal schedule.

Accordingly, there is a need in the art for a calendar system that provides an effective and versatile platform for allowing a user to interact and manage multiple applications while managing a personal schedule.

SUMMARY

In an embodiment, a computer-readable media encoded with a calendar application may include modules executable by a processor to display a calendar in response to a calendar access request from a client computer. The calendar application may include an authentication module to receive the calendar access request including input data entered by a user of the client computer, designate the calendar access request as an authorized access request if the input data includes valid authentication data, and designate the calendar access request as a guest access request if the input data does not include the valid authentication data. A display determination module may select one of a default calendar form and a customized calendar form for display, wherein the default calendar form is selected for display when the calendar access request is designated as the guest access request and the customized calendar form is selected for display when the calendar access request is designated as the authorized access request. A first content determination module may retrieve event data from a data store. The data store may include the event data for a plurality of events and populate the default calendar form with the event data for a first at least two of the plurality of events based on an identified contextual relationship between the event data for the first at least two of the plurality of events and a position separation between at least one keyword included in each of the first at least two of the plurality of events, wherein the at least one keyword is included in the input data. A second content determination module may retrieve a user input data set comprising user preference data from the data store, retrieve the event data for the plurality of events from the data store, and populate the customized calendar form with the event data for a second at least two of the plurality of events based on an identified contextual relationship between the event data for the second at least two of the plurality of events, a position separation between the at least one keyword included in each of the second at least two of the plurality of events, a viewing history of the user, and the user preference data. A user interface module may generate for display the selected one of the default calendar form with the event data for the first at least two of the plurality of events and the customized calendar form with the event data for the second at least two of the plurality of events.

In another embodiment, a system for displaying a calendar in response to a calendar access request from a client computer system may include a data store storing event data for a plurality of events and a server including a calendar application having modules executable by the server. The calendar application may include an authentication module to receive the calendar access request including input data entered by a user of the client computer, designate the calendar access request as an authorized access request if the input data includes valid authentication data, and designate the calendar access request as a guest access request if the input data does not include the valid authentication data. A display determination module may select one of a default calendar form and a customized calendar form for display, wherein the default calendar form is selected for display when the calendar access request is designated as the guest access request. The customized calendar form may be selected for display when the calendar access request is designated as the authorized access request. A first content determination module may retrieve event data from the data store and populate the default calendar form with the event data for a first at least two of the plurality of events based on an identified contextual relationship between event data for the first at least two of the plurality of events and a position separation between a keyword included in each of the first at least two of the plurality of events, wherein the keyword is included in the input data. A second content determination module may retrieve a user input data set comprising user preference data from the data store, retrieve the event data for the plurality of events from the data store, and populate the customized calendar form with the event data for a second at least two of the plurality of events based on an identified contextual relationship between the event data for the second at least two of the plurality of events, a position separation between the keyword included in each of the second at least two of the plurality of events, a viewing history of the user, and the user preference data. A user interface module may generate for display the selected one of the default calendar form with the event data for the first at least two of the plurality of events and the customized calendar form with the event data for the second at least two of the plurality events.

A method for displaying a calendar in response to a calendar access request from a client computer may include storing event data for a plurality of events in a data store; receiving a calendar access request at a processor, wherein the calendar access request comprises input data entered by a user and wherein input data includes authentication data and at least one keyword; designate the access request as an authorized access request at the processor if the input data includes valid authentication data; designate the access request as a guest access request at the processor if the input data does not include the valid authentication data; selecting, at the processor, one of a default calendar and a customized calendar to display, wherein the default calendar form is selected to display when the calendar access request is designated as the guest access request, and wherein the customized calendar form is selected to display when the calendar access request is designated as the authorized access request; retrieving event data from the data store and populating the default calendar form, when the default calendar form is selected, with the event data for a first at least two of the plurality of events based on an identified contextual relationship between event data for the first at least two of the plurality of events and a position separation between at least one keyword included in each of the first at least two of the plurality of events, wherein the at least one keyword is included in the input data; retrieving a user input data set comprising user preference and the event data from the data store and populating the customized calendar form, when the customized calendar form is selected, with the event data for a second at least two of the plurality of events based on an identified contextual relationship between event data for the second at least two of the plurality of events, a position separation between the at least one keyword included in each of the second at least two of the plurality of events; and generate for display the selected one of the default calendar form with the event data for the first at least two of the plurality of events; and the customized calendar form with the event data for the second at least two of the plurality events.

Implementation of the above embodiments may include one or more of the following features: an authentication module that is further configured to determine if the input data includes a selected date; a first content determination module that is configured to retrieve the event data from the data store for the selected date when the input data includes the selected date as well as retrieving the event data from the data store for a current date when the input data does not include the selected date; and a second content determination module that is configured to retrieve the event data from the data store for the selected date when the input data includes the selected date and also retrieve the event data from the data store for a current date when the input data does not include the selected date.

Additional objectives, advantages and novel features will be set forth in the description which follows or will become apparent to those skilled in the art upon examination of the drawings and detailed description which follows.

BRIEF DESCRIPTION OF THE DRAWINGS

FIG. 12 is a flow chart illustrating the method for logged in user interaction with the calendar system.

Corresponding reference characters indicate corresponding elements among the view of the drawings. The headings used in the figures should not be interpreted to limit the scope of the claims.

DETAILED DESCRIPTION

Figure 1:
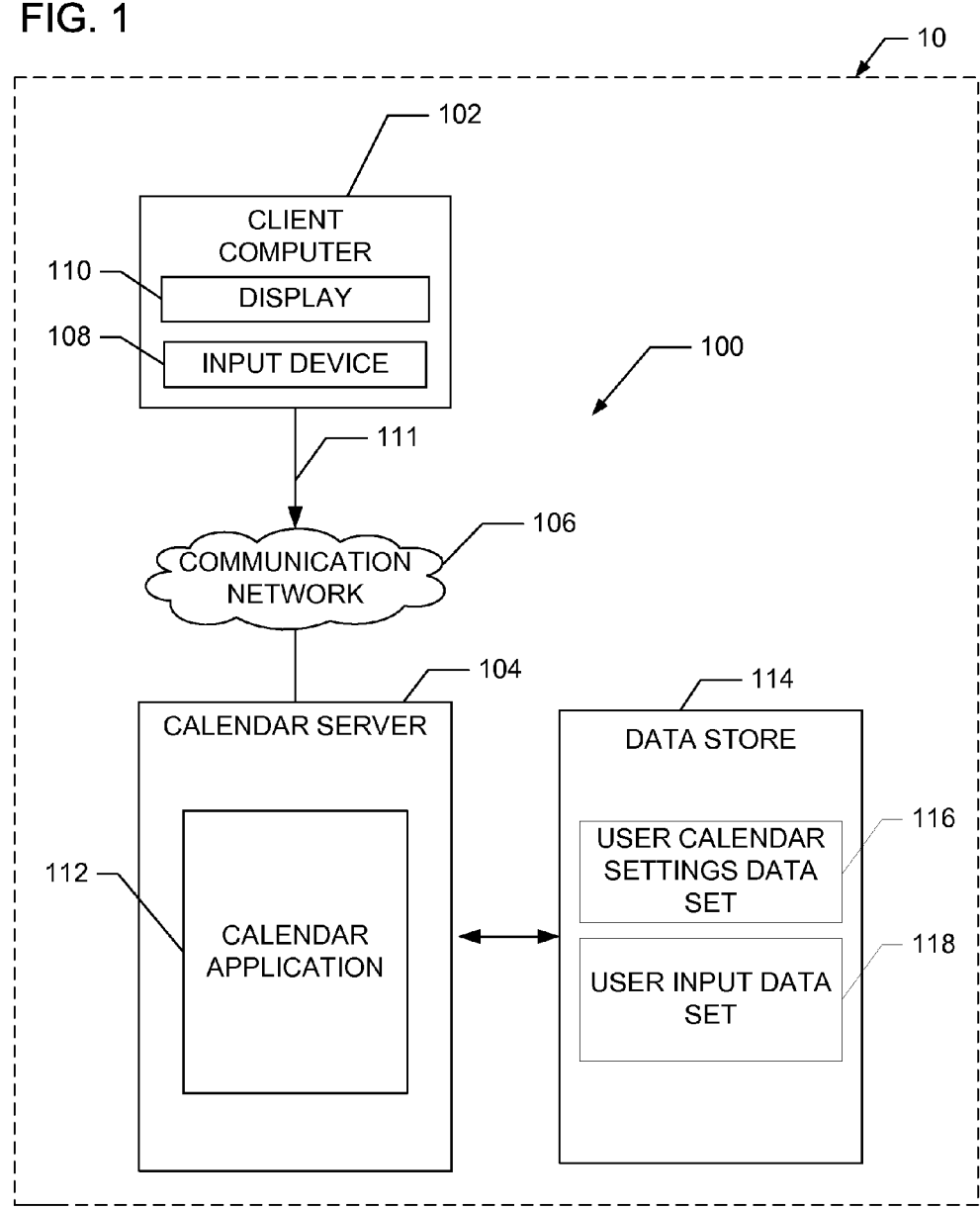
FIG. 1 is a simplified illustration showing the various aspects of the calendar system.

Referring to the drawings, a system and method for implementing a calendar system is generally indicated at 10 in FIGS. 1-12. FIG. 1 is a block diagram illustrating the various components of the calendar system 10 in an operating environment 100 in which aspects of the calendar system 10 may be implemented. In this instance, FIG. 1 diagrammatically shows the cross network communication between a client computer 102 and a calendar server 104 through a communication network 106 in the operating environment 100. More specifically, aspects of the calendar system 10 are described in the context of the client computer 102 being communicatively linked to the calendar server 104 such that data can be exchanged between the client computer 102 and the calendar server 104.

According to one aspect, the client computer 102 is a computing or processing device, such as a personal computer, a laptop computer, or a personal digital assistant. The client computer 102 may include an input device 108 that provides the user a means for interacting with the calendar server 104 and a display 110 for providing a visual display of data, graphics, or other display indicia, such as video, pictures, text, etc., to the user. In one aspect, the input device 108 may be a keyboard or a pointing device (e.g., a mouse, trackball, pen, or touch screen), for logging into the calendar system 10, viewing various calendar items and actions, customizing the calendar system10 to the user's requirements, browsing through various levels of the calendar system 10, and entering data into the calendar system 10. A user can utilize the input device 108 to generate a calendar access request 111.

The calendar access request 111 may include, for example, a selected date, a selected event, authentication data, or other user specified input. According to one aspect, the client computer 102 transmits the calendar access request 111 to the calendar server 104 via the data communication network 106. For example, the data communication network 106 may be the Internet (or the World Wide Web) that facilitates the transfer of data between the client computer 102 and the calendar server 104; however, the teachings of the calendar system 10 can be applied to any data communication network. Moreover, the client computer 102 and the calendar server 104 may communicate data between each other using Hypertext Transfer Protocol (HTTP), which is a protocol commonly used on the Internet to exchange information between client computers and servers.

According to one aspect, the calendar server 104 executes a calendar application 112 to provide various operational functionalities related to the calendar system 10 as shall be discussed in greater detail below. The calendar server 104 is also in operative communication with a data store 114 that stores calendar data related to the calendar system 10. For example, the calendar data in the data store 114 may include various data sets including, but not limited to, a user calendar settings data set 116 and a user input data set 118; however, other types of data sets are contemplated. The calendar settings data set includes, for example, customized calendar data defined by an administrative user of the calendar system 10. The user calendar settings data set 118 includes, for example, calendar preference data defined by a user of the calendar system 110.

According to another aspect, the calendar data in the data store 114 may also include event data and information related to the calendar system 10. As used herein, an event is an activity that is planned or organized to take place on a particular date and/or at a particular time. Event data may include an event name, an event description, an event image, an event date and time, and other data for each of one or more events.

Figure 2:
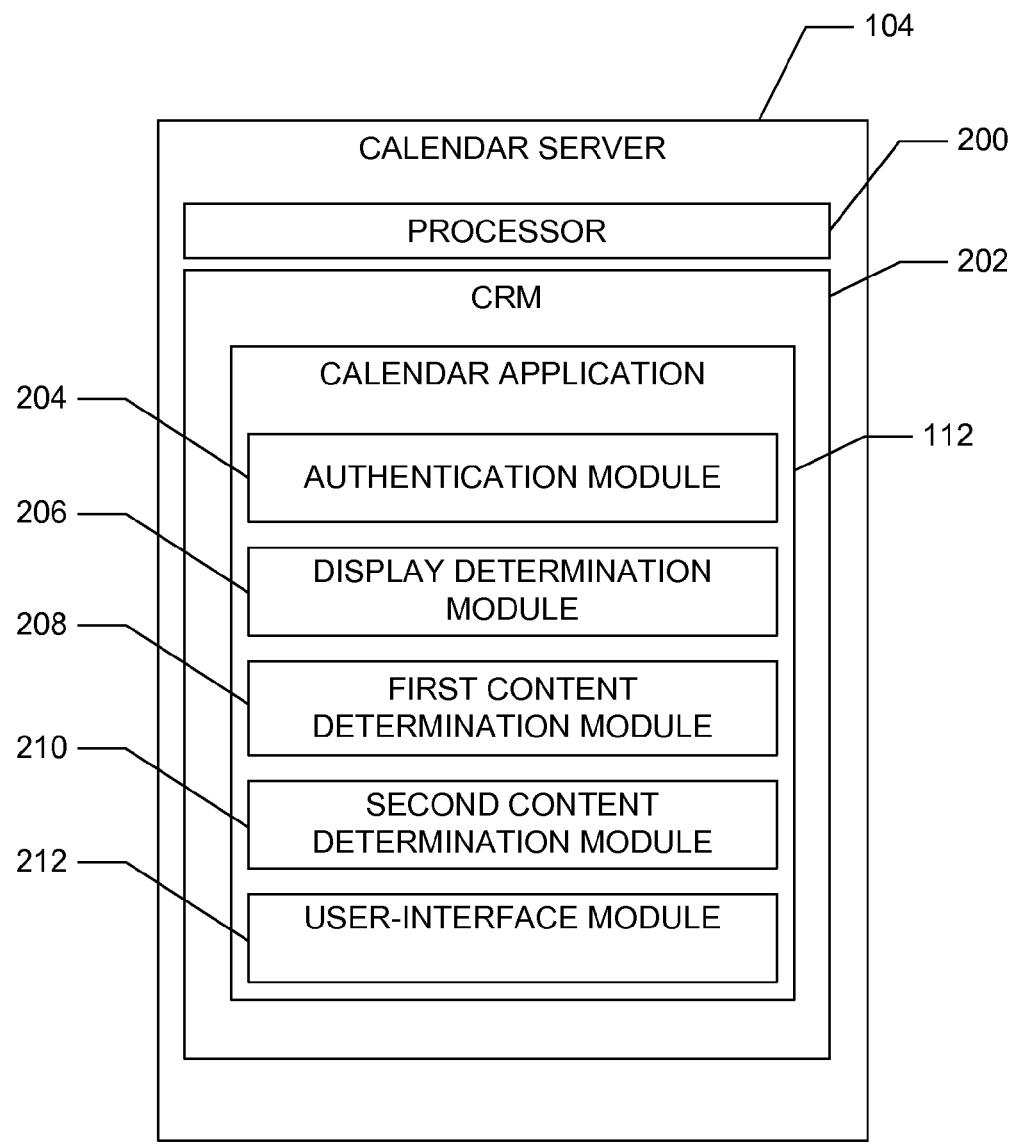
FIG. 2 is a simplified illustration of a calendar server including the various modules of the calendar system.

Referring to FIG. 2, a block diagram depicts an exemplary calendar server 104. According to one aspect, the calendar server 104 may include a processor 200 that executes the calendar application 112 to enable a user to view and/or enter calendar data and/or manage a personal schedule.

The calendar application 112 includes instructions or modules that are executable by the processor 200 to manage the retrieval and display of calendar data including event data. The calendar server 104 includes at least some form of computer readable media 202 (e.g., CRM) configured with the calendar application 112.

Computer readable media 202 may include volatile media, nonvolatile media, removable media, and non-removable media; however, any available media that may be accessed by the calendar server 104 is contemplated. By way of example and not limitation, computer readable media 202 may include computer storage media and communication media. Computer storage media may further include volatile, nonvolatile, removable and non-removable media implemented in any method or technology for storage of information such as computer readable instructions, data structures, program modules or other types of data media. Combinations of any of the above media are also included within the scope of the computer readable media 202 included on the calendar server 104. The client computer 102 may further include or be capable of accessing computer storage media in the form of removable and/or non-removable, volatile and/or nonvolatile memory. As noted above, the user may enter commands and information into the client computer 102 through the input device 108.

An authentication module 204 determines if a user has provided valid authentication data, such as a correct username and/or password, via the calendar access request 111. If the calendar access request 111 includes valid authentication data, the authentication module 204 designates the calendar access request 111 as being an authorized access request and the user is logged-into the calendar system 10. If the calendar access request 111 does not include valid authentication data, the authentication module 204 designates the calendar access request 111 as being a guest access request and the guest user is not logged-in to the calendar system 10. Although the guest user is not logged-in, the user has limited access to the calendar system 10.

According to another aspect, the authentication module 204 also determines if the user has selected a particular date for the calendar to display. If a date is not selected, the current date is displayed by default.

Figure 4:
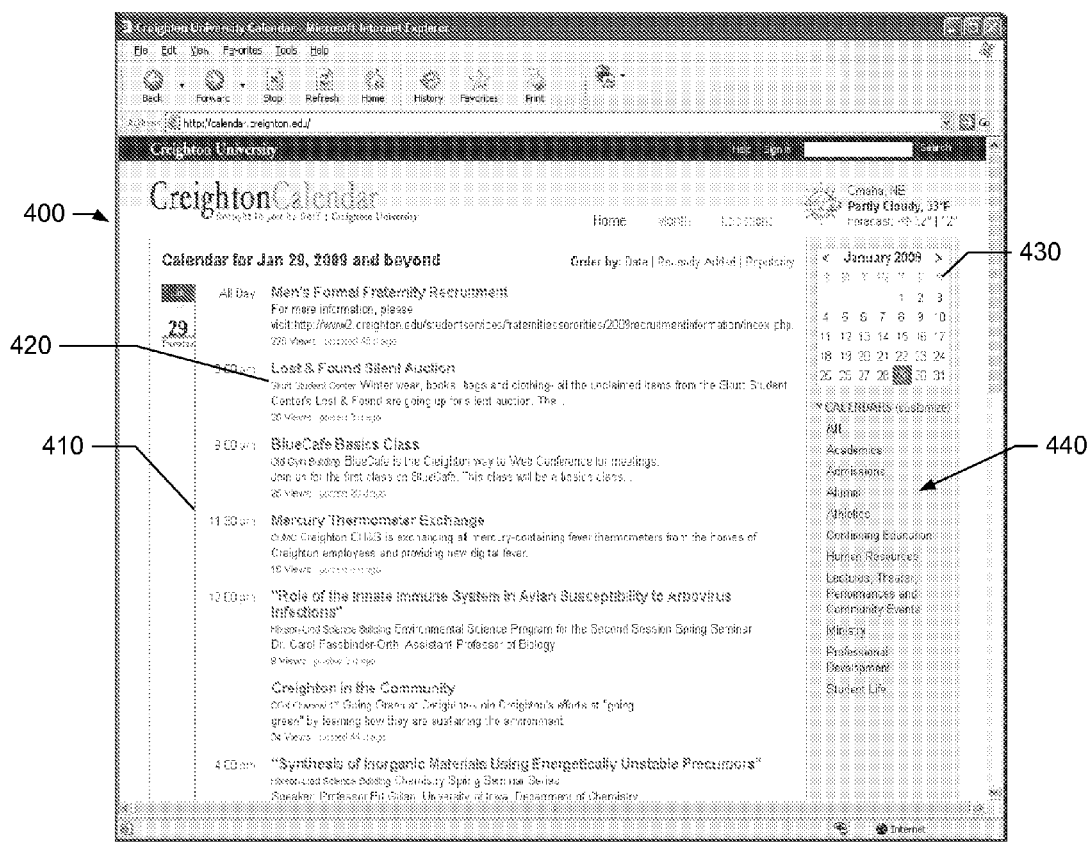
FIGS. 4-9 are screen views showing the various aspects of the calendar system.

A display determination module 206 determines the appropriate calendar form to display. For guest users, all events on all calendars are integrated into the default calendar display form 400, as shown in FIG. 4. For authorized users this module displays a customized calendar display form 600 shown in FIG. 6.

First and second content determination modules 208 and 210, respectively, populate the calendar display forms with the appropriate data in response to the authentication module 206 determining whether the user is a non logged-in user (e.g., a guest user) of a logged-in user (e.g., authenticated user). For example, the first and second content determination modules 208 and 210, which will be described further below, are used to populate the related events lists 520 and 720, respectively, shown in conjunction with the appropriate calendar display form 400 or 600, respectively. The user-interface module 212 interprets commands and other input received by the calendar server 104 from the client computer (s) 102.

Figure 3:
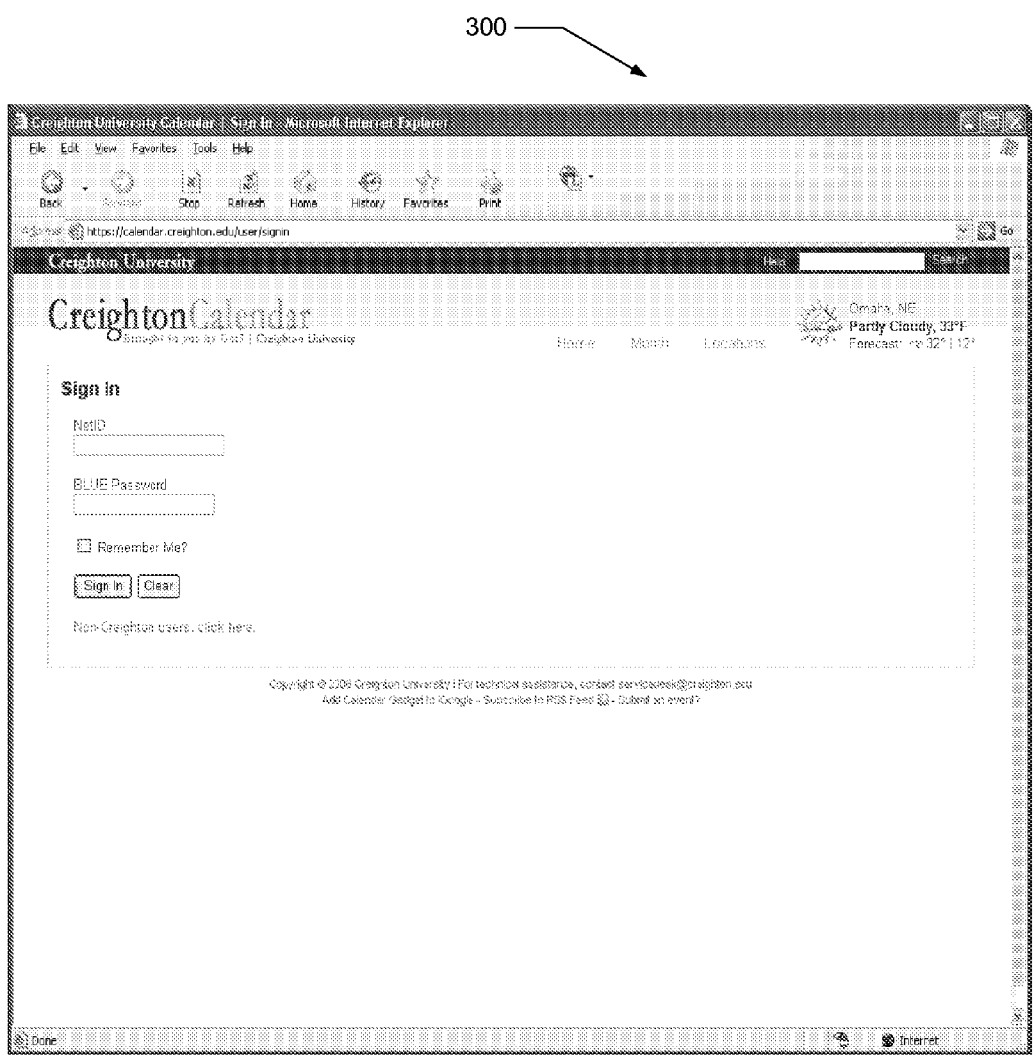
FIG. 3 is a screen view showing the log in function of the calendar system.
Figure 5:
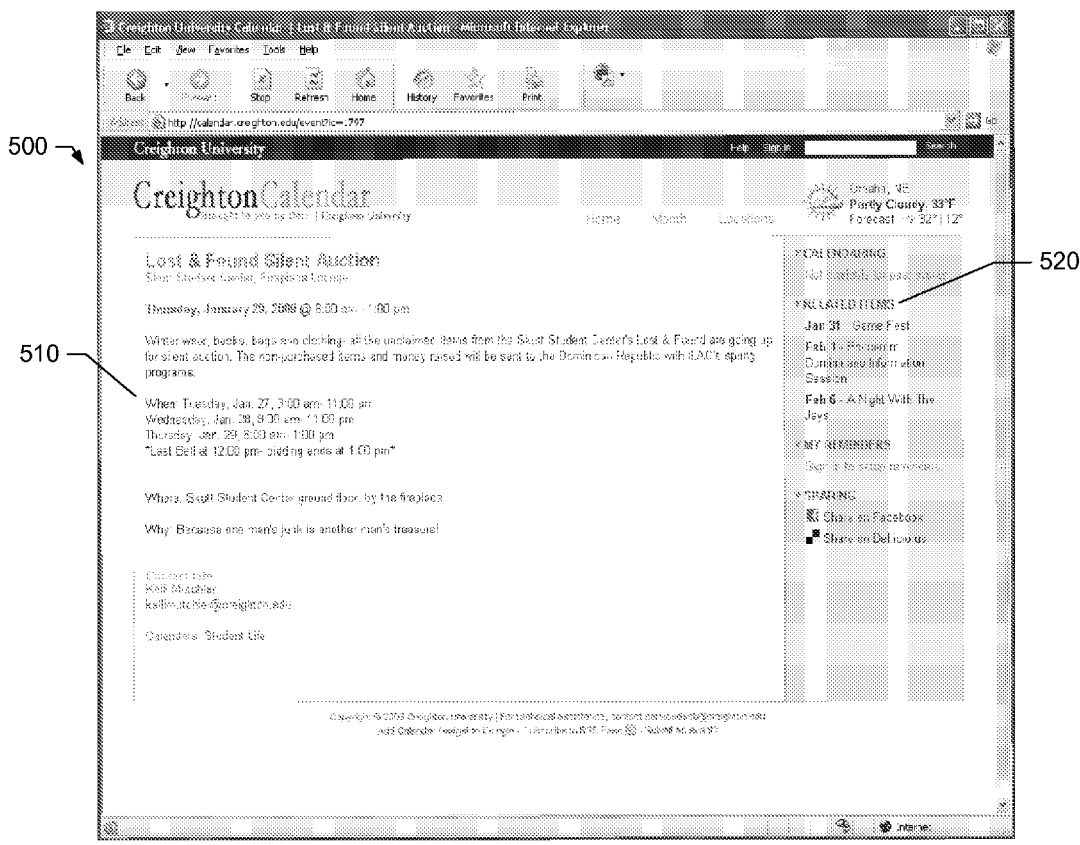

FIGS. 3-9 depict screenshots of various aspects of the calendar application 112. FIG. 3 shows an authentication form 300 where users can provide authentication data. FIG. 4 shows the default calendar form 400 that further depicts an event listing 410 that includes a variety of events taking place on a selected date. This listing is a compilation of events from all the different calendars on the calendar system 10. In a sidebar, a monthly calendar 430 and a listing of all the calendars 440 allow the user to customize and limit the information shown in FIG. 4. A user can select a particular event 420, for example the "Lost & Found Silent Auction," to view additional information for the event. Further details for the selected event 420 are shown in FIG. 5. As shown in form 500, event details 510 for the selected particular event are displayed as well as a contextually-based listing of related items 520.

Figure 6:
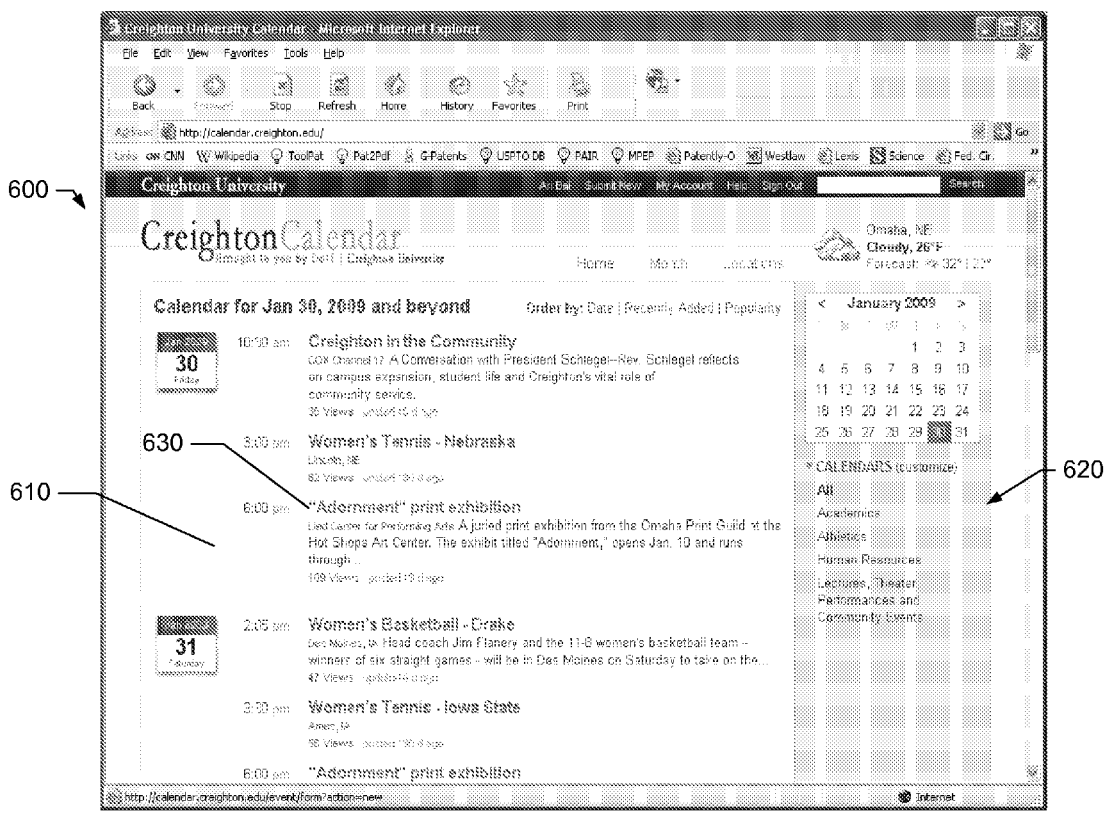
Figure 7:

For authenticated users of the calendar application 112, a customized calendar form 600 is displayed as depicted in FIG. 6. A customized listing of events 610 is compiled from a customized calendar list 620. The customized calendar list 620 includes a list of available calendars as determined from the customized calendar data stored in the data store 114. When an event 630 is selected, the authenticated user is shown an event detail form 700, as illustrated in FIG. 7. The event detail form 700 includes more details about the selected event 710. This calendar view also includes a listing of related items 720 and a listing of reminder requests 730 for the selected event 710. The related items for authenticated users are customized suggestions for similar events that may be of interest to the user. The suggested events for an authenticated user that populate list 720 are identified by use of an algorithm that takes in to account many contextual, historical, and user input factors.

In another embodiment, the calendar application 112 executes the first content determination module 208 to populate the related items 520 for guest users and executes the second content determination module 210 to populate the related suggestions items 720 for authenticated users. According to one aspect, the first content determination module 208 uses a word-based contextual algorithm to identify related items 520. For example, the first content determination module 208 uses keywords from events to determine a weighted contextual relationship between the events. When given events A (Men's Basketball) and B (Men's Intramural Basketball) which are being compared for contextual similarity, the algorithm defines the set of keywords common to both A and B as K, such that K=k(A)^k(B). A set S is created by intersecting the keywords of A with the set of keywords of B. Next, a Frequency Score is calculated by taking the sum of the greatest frequency counts for each common keyword. For example, if "Men's" is in set K, meaning that it is common to both A and B, and "Men's" in A occurs 2 times, but occurs 5 times in B, then 5 is added to the running sum. For shorter event titles and descriptions, taking a top arbitrary variable N (e.g., a threshold value) for the Frequency Scores of events can provide an accurate measure of contextual similarity, especially when the number of related events to be returned by N is small.

To provide a more accurate comparison of contextual similarity, the first content determination module 208 can also take into account keyword position separation within the text of events A and B. For example, given A's keyword sequence of "Men's Basketball", and B's keyword sequence of "Men's Intramural Basketball", the difference between "Basketball" and "Men's" in A is +1 position difference, and in B, the difference is +2. By subtracting the larger difference from the smaller for the pair of common keywords, a Proximity Similarity Score for "Men's Basketball" of 1 is calculated. For all other keyword pairs in the set, K, this same calculation is performed. Next, the average of all these scores is evaluated to arrive at an overall Proximity Similarity Score for the pair of events A and B. This value is multiplied by a weighting factor, and subtracted from the previously calculated Frequency Score for events A and B. This final value is the Final Similarity Score, with higher scores being considered as the most relevant related events. According to one aspect, the Final Similarity Score is compared to a threshold Final Similarity Score to determine the most relevant related events. The threshold Final Similarity Score is defined, for example, by an adminstrative user and is stored in the data store 114.

When the user is an authenticated user, the calendar application 112 executes the second content determination module 210 that uses a more robust algorithm to populate the suggest events list 720. The second content determination module 210 differs from the first content determination module 208 previously described, in that it takes into account not only what the user is currently viewing, but also what the user has previously viewed, when the user viewed those events, how often the user viewed those events, and the number of times other users have viewed those set of events. These new factors are figured into a Suggested Events Score and returned to the user from highest to lowest score, for all scores, which are above a specified cutoff threshold. To understand the differences between the first and second content determination modules 208 and 210, consider the following five calendar events wherein these events include the entire set of calendar subjects:

1) Men's Basketball—Georgetown
   Event Description: Come join us as the Jays Men's Basketball team takes on Georgetown.
2) Men's Basketball—Southern Illinois
   Event Description: Come join us as the Jays Men's Basketball team takes on Southern Illinois.
3) Men's Basketball—Texas A&M
4) Women's Basketball
5) Omaha Alumni Event
   Event Description: Join fellow alums at the Jays pre-game party at Billy Blue's.

If a guest user is currently viewing Item 1, the first content determination module 208 will analyze the title and description of the event. This includes identifying keywords and discarding certain other words that have little contextual meaning such as "as", "the", and "on". With this set of keywords, along with frequencies of those keywords, the algorithm will search for up to three (or any other specified maximum limit) other events that contain the same keywords, keyword frequencies and keyword sequences, and calculate a weighted score based on these factors. The three highest scoring events that also meet or exceed the application-wide cutoff threshold will be listed under Related Events 520. In this example, Items 2 and 3 would meet these criteria.

For authenticated users the second content determination module 210 not only considers context, but also considers other criteria such of unique views, time of day, user locale based on IP address, and certain user inputs, among others, to calculate the Suggest Events Score. The second content determination module 210 also evaluates such factors as whether the user has provided a RSVP declaration for the same or related events in the past, what other types of events were viewed, user comments made about other events, as well as reminder requests submitted by the user. For example, using the example events above, if the user has never or infrequently viewed basketball events in the past, but frequently views or attends alumni events, then Item 5 would be suggested to the user.

Figure 8:
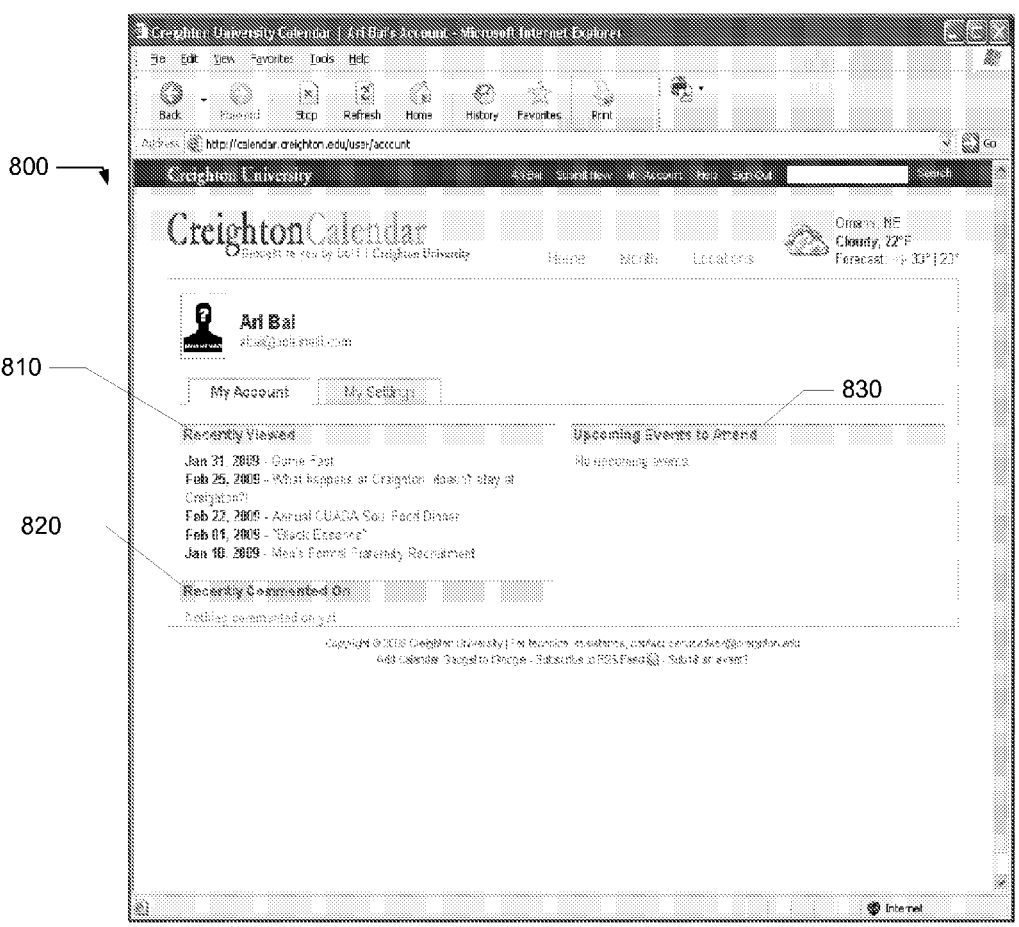
Figure 9:
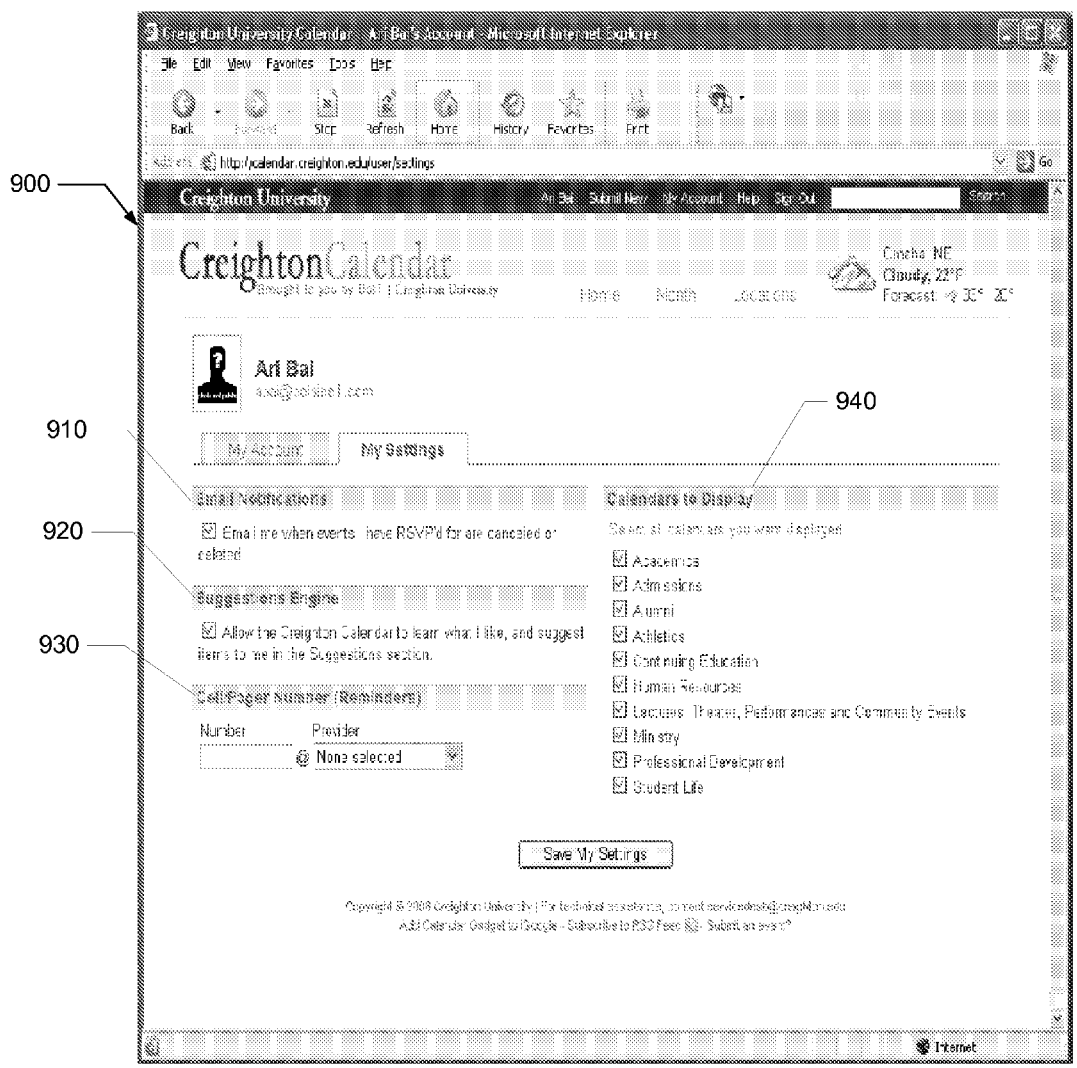

FIG. 8 shows the user account form 800. This form includes a listing of events viewed by the user 810, a listing of comments recently submitted by the user 820, as well as a listing of upcoming events to attend 830. The account view form 800 also includes a tab to adjust the user's preferences and settings 840. The settings tab 840 leads users to the settings display form 900 shown in FIG. 9. The settings form 900 allows the user to define the user input data set (e.g., user settings) for storage in the data store 114. The user input data set specifies, for example, whether a user desires o receive email reminders for events 910, suggestions for other events 920, telephone reminders of events selected 930. The settings form 900 also includes a calendar selection section 940. This calendar selection 940 allows users to choose the calendars from which events are compiled for integration into the customized calendar list 620 that displayed in the customized calendar form 600.

Figure 10:
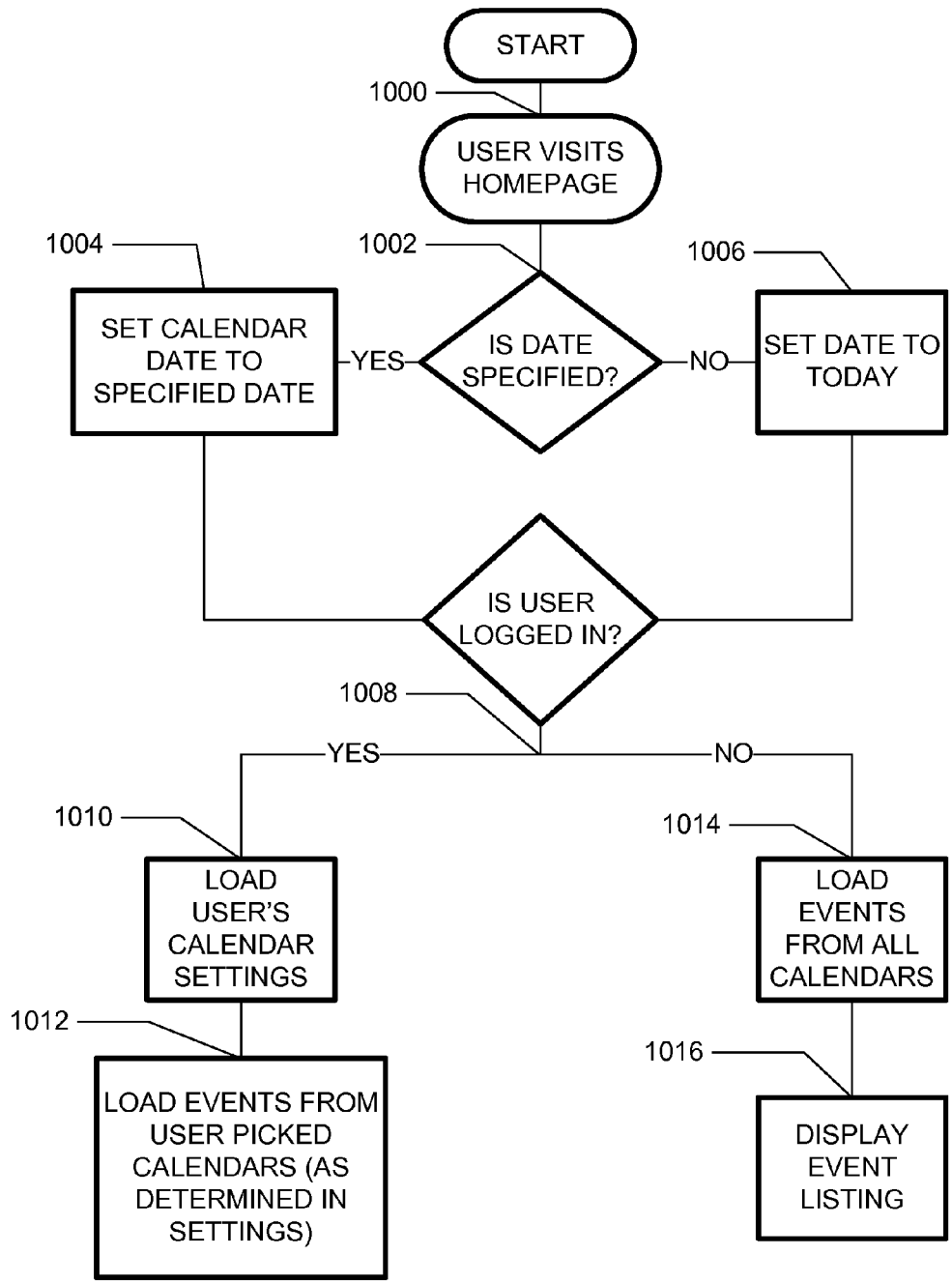
FIG. 10 is a flow chart illustrating the general method of operation for the calendar system.

Now referring to FIG. 10, a method for displaying events on multiple calendars according to one aspect of the calendar system 10 is shown. At step 1000, a default calendar form 400 (FIG. 4) is generated for display by the user-interface module 212 in response to a calendar access request 111 received from the client computer 102. The authentication module 204 determines if a calendar date is specified in the request at step 1002. If the request includes a specific date set by the user then the authentication module 204 authenticates the user's login information (FIG. 3) at step 1004. In the alternative, if the user fails to specify a particular calendar date, then the authentication module 204 automatically sets the date to the present date at step 1006. The display determination module 206 populates the event content of the calendar form 400 (FIG. 4) at step 1008. The authentication module 204 determines whether a user is an authenticated user or a guest user. For example, if the user is determined to be an authenticated user at step 1008, then the display determination module 206 loads customized calendar data defined by the user's calendar settings data set 116 that is stored in the data store 114 at step 1010. For example, see the customized calendar list 620 shown in FIG. 6. At step 1012, the display module 206 loads events that pertain only to the user-preferred calendars. In the alternative, if the user is determined to be a guest user, then the display module 206 loads and displays events for all calendars into the calendar form 400 (FIG. 4) at step 1014. According to one aspect, the calendar form 400 at step 1014 displays event listings for all events at step 1016. For example, the guest calendar form may be the same as the default calendar form 400 shown in FIG. 4.

Figure 11:
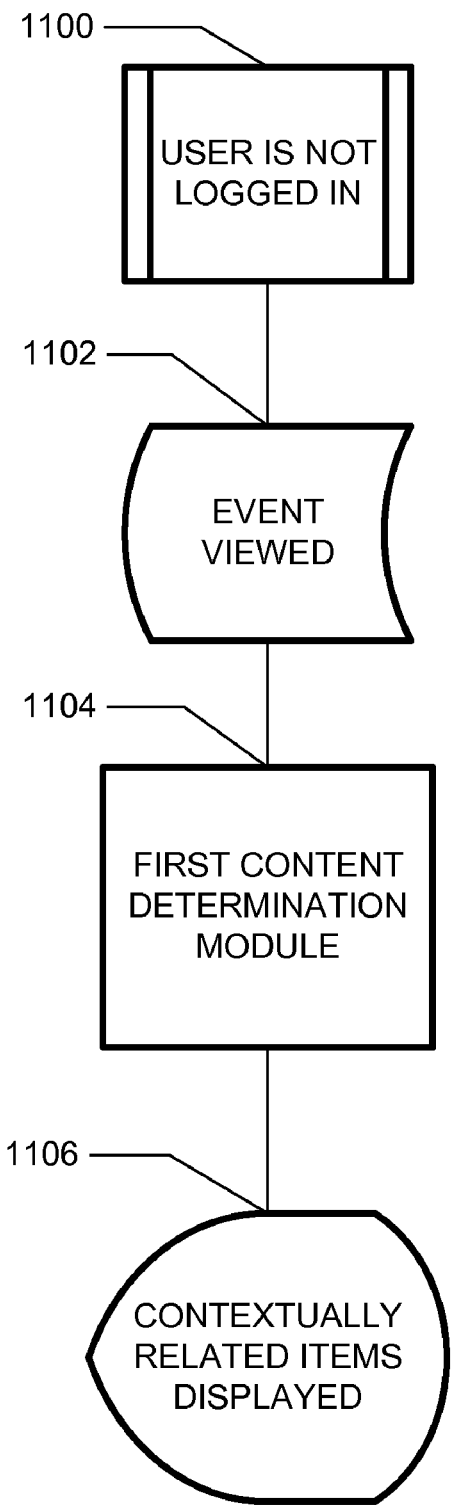
FIG. 11 is a flow chart illustrating the method for guest user interaction with the calendar system.

FIG. 11 depicts a method for managing a guest user interaction according to one aspect of the calendar system 10. In particular, this flow chart illustrates selection and display of related events for a user determined to be a guest user. At step 1100, the authentication module 204 determines that the user is a guest user. The user is allowed to view events at step 1102. For example, see the calendar form 400 for guest users shown in FIG. 4. At step 1104, the first content determination module 208 identifies contextually related items 520 (FIG. 5) based solely upon a textual analysis of the event(s) viewed by the user. These related items 520 are displayed in the calendar form 400 at step 1106.

Referring to FIG. 12, a method for managing an authenticated user interaction according to another aspect of the calendar system 10 is provided. At step 1200, a default calendar form 400 is generated for display by the user-interface module 212 in response to a calendaring access request received from the client computer 102. The authentication module 204 evaluates the parameters of the login information provided by a user at step 1202. If the authentication module 204 determines that a user is an authenticated user at step 1202, then the display determination module 206 removes "negative data" or data that should not be displayed in the customized view at step 1204. For example, see the customized calendar list 620 shown in FIG. 6. The content of the "negative data" is based on the user calendar settings data set 116, as previously described. At step 1206, the calendar form 400 is further customized in response to prior user input data set 118 stored in the data store 114. The second content determination module 210 evaluates a plurality of factors based upon the prior user input data set 118 to identify and provide customized suggestions of contextually related event at step 1216. The second content determination module 210 considers past RSVP declarations provided by the user at step 1208. At step 1210, previous events on the calendar form 400 that were viewed by the user are evaluated to further customize the contextually related suggestions. Likewise, the previous comments provided by the user may be evaluated by the second content module 210 at step 1212. Additional factors considered by this content module 210 are prior reminder requests 730 (FIG. 7) made by the user to be reminded of a calendar event. In the execution of 1206, the prior user input data sets 118 may be conducted in parallel or in series to ultimately provide customized contextually-related suggestions 720 and populate the calendar form 700 at step 1216.

When introducing elements of the calendar system 10 or embodiments thereof, the articles "a", "an", "the", and "said" are intended to mean that there are one or more of the elements. The terms "comprising", "including" and "having" are intended to be inclusive and mean that there may be additional elements other than the listed elements.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system for displaying a calendar in response to a calendar access request from a client computer, the system comprising:
    at least one processor;
    a data store storing event data for a plurality of events;
    a calendar application encoded on and executable by the at least one processor to:
        receive the calendar access request comprising input data entered by a user of the client computer;
        designate the calendar access request as an authorized access request if the input data includes valid authentication data; and
        designate the calendar access request as a guest access request if the input data does not include the valid authentication data;
    select one of a default calendar form and a customized calendar form for display, wherein:
        the default calendar form is selected for display when the calendar access request is designated as the guest access request; and
        the customized calendar form is selected for display when the calendar access request is designated as the authorized access request;
    retrieve event data from the data store; and
    populate the default calendar form with the event data for a first at least two of the plurality of events based on:
        an identified contextual relationship between event data for the first at least two of the plurality of events; and
        a position separation between a keyword included in each of the first at least two of the plurality of events, wherein the keyword is included in the input data;
    retrieve a user input data set comprising user preference data from the data store;
    retrieve the event data for the plurality of events from the data store; and
    populate the customized calendar form with the event data for a second at least two of the plurality of events based on:
        an identified contextual relationship between the event data for the second at least two of the plurality of events;
        a position separation between the keyword included in each of the second at least two of the plurality of events;
        a viewing history of the user; and
        the user preference data; and
    generate for display the selected one of:
        the default calendar form with the event data for the first at least two of the plurality of events; and
        the customized calendar form with the event data for the second at least two of the plurality of events.

2. The system of claim 1 wherein the event data comprises at least one of an event name, an event description, an event image, and an event date and time.

3. The system of claim 1
    the calendar application executable by the at least one processor is further configured to:
        determine if the input data includes a selected date; and
        populate the default calendar form with the event data for the selected date when the input data includes the selected date; and
        populate the default calendar form with the event data for a current date when the input data does not include the selected date.

4. The system of claim 3 wherein the default calendar form comprises a default event listing, the default event listing identifying events occurring on the selected date or the current date.

5. The system of claim 3 wherein a calendar application executable by the at least one processor is further configured to:
    populate the customized calendar form with the event data for the selected date when the input data includes the selected date; and
    populate the customized calendar form with the event data for a current date when the input data does not include the selected date.

6. The system of claim 3 wherein a calendar application executable by the at least one processor executes a first algorithm to:
    calculate a frequency score for the at least one keyword included in each of the first at least two of the plurality of events; and populate the default calendar form with event data for the first at least two of the plurality of events when the frequency score is at least equal to a threshold frequency score retrieved from the data store.

7. The system of claim 6 wherein:
the data store further comprises a weighting factor; and
a calendar application executable by the at least one processor executes the first algorithm to:
  determine a first proximity score based on the position separation between a first keyword of the at least one keyword included in each of the first at least two of the plurality of events;
  determine a second proximity score based on the position separation between a second keyword of the at least one keyword included in each of the first at least two of the plurality of events;
  calculate an average of the first and second proximity scores to determine an overall proximity score;
  multiply the overall proximity score by the weighting factor to determine a weighted proximity score;
  subtract the weighted proximity score from the frequency score to determine a final similarity score; and
  populate the default calendar form with the event data for the first at least two of the plurality of events when the final similarity score is at least equal to a threshold final similarity score.

8. The system of claim 7 wherein:
the data store further comprises the viewing history of the user, the viewing history comprises previous events viewed by the user, a period of time during which the previous events were viewed, a number of times the previous events were viewed by the user, and different number of times the previous events were viewed by other users;
a calendar application executable by the at least one processor executes the first algorithm to
  calculate a second frequency score for the first and second keywords included in each of the second at least two of the plurality of events;
  determine another first proximity score based on the position separation between a first keyword included in each of the second at least two of the plurality of events;
  determine another second proximity score based on the position separation between a second keyword included in each of the second at least two of the plurality of events;
  calculate the average of the other first and second proximity scores to determine an overall proximity score;
  multiply the overall proximity score by the weighting factor to determine a weighted proximity score; and
  subtract the weighted proximity score form the frequency score to determine a second final similarity score; and
a calendar application executable by the at least one processor executes a second algorithm to:
  calculate a suggested event score based the viewing history; and
  populate the customized calendar form with event data for the second at least two of the plurality of events based on the second final similarity score, the suggested events score, and the user preference data.

9. The system of claim 1 wherein:
the data store further comprises a calendar settings data set comprising customized calendar data defined by an administrative user; and
the customized calendar form comprises:
  a customized calendar list that identifies available customized calendars for a plurality of event types based on the customized calendar data; and
  a customized listing of events, the customized listing of events corresponding to one or more of customized calendars selected from the customized calendar list by the user.

10. The system of claim 9 wherein the customized calendar forms displays an event detail form and a listing of relating items in response to a selected one of the customized listing of events, and wherein:
the event detail form comprises detailed information about the selected one of the customized events; and
the listing of related items comprises suggested invents based on contextual, historical, and user defined preferences.

11. A method for displaying a calendar in response to a calendar access request from a client computer, the method comprising:
  storing event data for a plurality of events in a data store;
  receiving a calendar access request at a processor, wherein the calendar access request comprises input data entered by a user, wherein input data includes authentication data and at least one keyword;
  designate the calendar access request as an authorized access request at the processor if the input data includes valid authentication data;
  designate the calendar access request as a guest access request at the processor if the input data does not include the valid authentication data;
  selecting, at the processor, one of a default calendar and a customized calendar to display, wherein the default calendar form is selected to display when the calendar access request is designated as the guest access request, and wherein the customized calendar form is selected to display when the calendar access request is designated as the authorized access request;
  retrieving event data from the data store and populating the default calendar form, when the default calendar form is selected, with the event data for a first at least two of the plurality of events based on an identified contextual relationship between event data for the first at least two of the plurality of events and a position separation between at least one keyword included in each of the first at least two of the plurality of events, wherein the at least one keyword is included in the input data;
  retrieving a user input data set comprising user preference and the event data from the data store and populating the customized calendar form, when the customized calendar form is selected, with the event data for a second at least two of the plurality of events based on an identified contextual relationship between event data for the second at least two of the plurality of events, a position separation between the at least one keyword included in each of the second at least two of the plurality of events; and
  generate for display the selected one of:
    the default calendar form with the event data for the first at least two of the plurality of events; and
    the customized calendar form with the event data for the second at least two of the plurality of events.

12. The method of claim 11 wherein the event data comprises an event name, an event description, an event image, and an event date and time.

13. The method of claim 11 further comprising:
  determining if the input data includes a selected date at the processor;

retrieving the event data from the data store for the selected date when the input data includes the selected date; and
retrieving the event data from the data store for a current date when the input data does not include the selected date.

14. The method of claim 13 wherein the default calendar form generated for display comprises a default event listing, the default event listing identifies events occurring on the selected date or the current date.

15. The method of claim 13 further comprising:
populating the customized calendar form with the event data for the selected date when the input data includes the selected date; and
populating the customized calendar form with the event data for the current date when the input data does not include the selected date.

16. The method of claim 13 further comprising:
executing a first algorithm at the processor to:
calculate a frequency score for the at least one keyword included in each of the first at least two of the plurality of events; and
populate the default calendar form with event data for the first at least two of the plurality of events when the frequency score is at least equal to a threshold frequency score retrieved from the data store.

17. The method of claim 16 further comprising:
retrieving a weighting factor from the data store; and
executing the first algorithm at the processor to:
determine a first proximity score based on the position separation between a first keyword of the at least one keyword included in each of the first at least two of the plurality of events;
determine a second proximity score based on the position separation between a second keyword of the at least one keyword included in each of the first at least two of the plurality of events;
calculate an average of the first and second proximity scores to determine an overall proximity score;
multiply the overall proximity score by the weighting factor to determine a weighted proximity score;
subtract the weighted proximity score from the frequency score to determine a final similarity score; and
populate the default calendar form with the event data for the first at least two of the plurality of events when the final similarity score is at least equal to a threshold final similarity score.

18. The method of claim 17 further comprising:
retrieving the viewing history of the user from the data store, the viewing history comprises previous events viewed by the user, a period of time during which the previous events were viewed, a number of times the previous events were viewed by the user, and different number of times the previous events were viewed by other users;
executing the first algorithm at the processor to:
calculate a second frequency score for the first and second keywords included in each of the second at least two of the plurality of events;
determine another first proximity score based on the position separation between the first keyword included in each of the second at least two of the plurality of events;
determine another second proximity score based on the position separation between the second keyword included in each of the second at least two of the plurality of events;
calculate the average of the other first and second proximity scores to determine an overall proximity score;
multiply the overall proximity score by the weighting factor to determine a weighted proximity score; and
subtract the weighted proximity score form the frequency score to determine a second final similarity score; and
executing the second algorithm at the processor to:
calculate a suggested event score based the viewing history; and
populate the customized calendar form with event data for the second at least two of the plurality of events based on the second final similarity score, the suggested events score, and the user preference data.

19. The method of claim 11 further comprising:
retrieving a calendar settings data set from the data store, the calendar settings data set comprising customized calendar data defined by an administrative user; and
displaying the customized calendar form comprising:
a customized calendar list that identifies available customized calendars for a plurality of event types based on the customized calendar data; and
a customized listing of events, the customized listing of events corresponding to one or more of customized calendars selected from the customized calendar list by the user.

20. The method of claim 19 further comprising:
displaying the customized calendar comprising an event detail form and a listing of relating items in response to a selected one of the customized listing of events, and wherein:
the event detail form comprises detailed information about the selected one of the customized events; and
the listing of related items comprises suggested invents based on contextual, historical, and user defined preferences.

* * * * *

UNITED STATES PATENT AND TRADEMARK OFFICE
CERTIFICATE OF CORRECTION

PATENT NO. : 8,126,922 B2  
APPLICATION NO. : 12/537923  
DATED : February 28, 2012  
INVENTOR(S) : Damien Holzapfel et al.

Page 1 of 1

It is certified that error appears in the above-identified patent and that said Letters Patent is hereby corrected as shown below:

Title Page, Item (73) Assignee: "Crieghton University" should read --Creighton University--

Claim 20, col. 14, line 49: "invents" should read --events--

Signed and Sealed this
Seventeenth Day of April, 2012

David J. Kappos
*Director of the United States Patent and Trademark Office*